United States Patent
Sihler

(10) Patent No.: US 7,518,344 B2
(45) Date of Patent: Apr. 14, 2009

(54) METHOD AND DAMPING DEVICE FOR DAMPING A TORSIONAL VIBRATION IN A ROTATING DRIVETRAIN

(75) Inventor: Christof Sihler, Hallbergmoos (DE)

(73) Assignee: Max-Planck-Gesellschaft zur Förderung der Wissenschaften e.V., Munich (DE)

( * ) Notice: Subject to any disclaimer, the term of this patent is extended or adjusted under 35 U.S.C. 154(b) by 327 days.

(21) Appl. No.: 10/560,565

(22) PCT Filed: Jun. 2, 2004

(86) PCT No.: PCT/EP2004/005933
§ 371 (c)(1),
(2), (4) Date: May 8, 2006

(87) PCT Pub. No.: WO2004/112234
PCT Pub. Date: Dec. 23, 2004

(65) Prior Publication Data
US 2006/0244425 A1  Nov. 2, 2006

(30) Foreign Application Priority Data
Jun. 13, 2003 (DE) ............... 103 26 816
Dec. 17, 2003 (DE) ............... 103 59 259

(51) Int. Cl.
*H02K 29/96* (2006.01)
(52) U.S. Cl. .............. 322/58; 322/46; 322/544; 322/61; 322/69
(58) Field of Classification Search .......... 322/58
See application file for complete search history.

(56) References Cited

U.S. PATENT DOCUMENTS

| 4,080,559 A | | 3/1978 | Wright et al. | |
|---|---|---|---|---|
| 4,150,547 A | * | 4/1979 | Hobson | 60/659 |
| 4,326,158 A | | 4/1982 | Helgesen | |
| 4,377,780 A | | 3/1983 | Björklund | |
| 5,537,967 A | | 7/1996 | Tashiro et al. | |
| 5,804,949 A | | 9/1998 | Othman et al. | |
| 5,929,537 A | * | 7/1999 | Glennon | 307/46 |
| 6,741,067 B2 | * | 5/2004 | Taniguchi et al. | 322/28 |

FOREIGN PATENT DOCUMENTS

DE  35 40 645 C2  11/1987
DE  196 14 470 A1  10/1997

OTHER PUBLICATIONS

Wu, C.-J., et al.; "Application of simultaneous active and reactive power modulation of superconducting magnetic energy storage unit to damp turbine-generator subsynchronous oscillations", IEEE Transactions on Energy Conversion (1993), vol. 8, pp. 63-70.

* cited by examiner

*Primary Examiner*—Nicholas Ponomarenko
*Assistant Examiner*—Iraj A Mohandesi
(74) *Attorney, Agent, or Firm*—Drinker Biddle & Reath LLP

(57) ABSTRACT

A method and a damping device are proposed for damping a torsional oscillation in a rotating drive train. Arranged on the drive train is an electrical machine (13), which is connected to an electrical multipole (31). A damping torque is generated in the electrical machine (13) by an electrical damping member connected to the electrical machine (13). It is proposed that the damping torque has a predetermined damping frequency and is antiphase to the angular velocity of the torsional oscillation.

22 Claims, 5 Drawing Sheets

Figure 1:
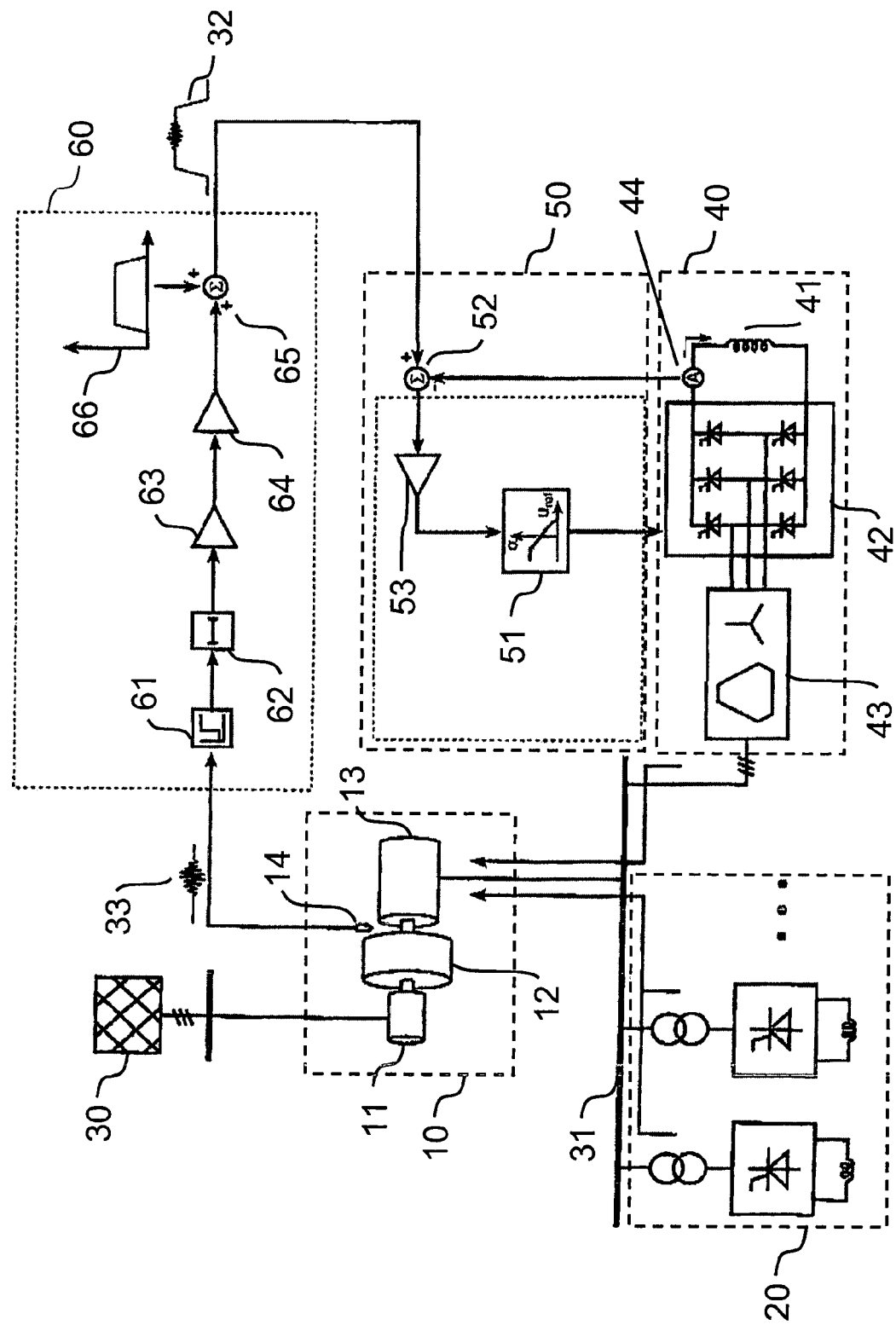

METHOD AND DAMPING DEVICE FOR DAMPING A TORSIONAL VIBRATION IN A ROTATING DRIVETRAIN

The invention relates to a method for damping a torsional oscillation in a drive train having an electrical machine, as well as a corresponding damping device arranged for generating a damping torque in the electrical machine.

In drive trains, which serve to transmit torque and which include an electric motor or generator, torsional oscillations can occur, particularly where the mass of the moving parts is large or if the shaft and the components attached to the shaft have large moments of inertia combined with low damping, as is typically the case where steel is used as a basic material. Due to the low damping, only relatively small amounts of power are needed to excite a resonant torsional oscillation (torsional oscillation at a resonant frequency). This excitation may be provided, in particular, by mechanical and/or electrical means. On the mechanical side, excitations can be caused, for example, by sudden changes in mechanical loading over a broad excitation frequency range. On the electrical side, for example, the switching on or off of loads in the case of a generator can represent an excitation, or excitations at the resonant frequency may come from transient electromagnetic processes in the power supply net.

Resonant torsional oscillations can cause significant damage to the drive train or parts thereof, such as for example, couplings. Should the drive train fail, that is, if a breakage were to occur due to the torsional loading, because of the high level of mechanical energy of the rotating components of the drive train, this can result in the destruction of parts connected to the drive train. Even if the damages are noticed in good time, repairs are complex and, due particularly to the decommissioning during the repair period, very costly. Since simple switching off the machines when the said torsional oscillations occur is possible but also economically disadvantageous, a variety of systems have been developed in order to prevent such oscillations.

For example, a device is described in the U.S. Pat. No. 5,804,949, which device suppresses unwanted oscillations on the load side of a generator by controlled switching of capacitors and/or inductances, and thereby suppresses or at least dampens oscillatory excitation of the drive shaft to which the generator is connected.

A disadvantage of this device is that it only suppresses resonance excitation by the electrical load, but does not dampen the oscillation directly and therefore cannot counteract any excitation arising mechanically.

For the direct damping of torsional oscillations in the drive train of a generator, in "IEEE Trans. Energy Conv.", vol. 8, p. 63 ff., 1993, C.-J. Wu et al. propose a system with an intermediate energy storage from which effective power can be transferred to the generator and thereby oscillation of the drive train can be counteracted. For intermediate energy storage, a superconducting coil arranged in a direct current circuit is used, the direct current circuit being connected via a thyristor circuit and a transformer to the electrical network of the generator. The network comprises a plurality of different consumer units, which temporarily connect or disconnect loads independently of each other. The original purpose of the arrangement described by C.-J. Wu et al. is not oscillation damping, but the provision of an intermediate energy storage to even out short-term load differences in the network. In that the control system for the arrangement is made subordinate to a controller, which registers speed changes in the axle of the generator and counteracts these with the aid of the arrangement, torsional oscillations in the drive train, which manifest themselves as speed changes in the axle of the generator, can be damped.

Direct damping of the torsional oscillations could in theory be achieved with this method. However, due in particular to the following disadvantages, the method of C.-J. Wu et al. is unsuitable for practical applications. With this method, all speed changes are thus detected and damped, regardless of whether they belong to a resonant torsional oscillation or not. This can therefore lead to faults in the operation of the generator.

Furthermore, operation in a network to which a plurality of generators are connected whose drive trains possibly have different resonant frequencies is problematic, since the damping of one oscillation in one drive train can lead to an oscillation in a different drive train.

In order to provide the energy for wide-band damping of the drive train, a superconducting coil of large inductance is also necessary, the operation of which is also associated with further disadvantages.

Among other things, one problem of using a large superconducting coil for damping oscillations is that on output of effective power in the region between 10 Hz and 40 Hz, alternating field losses can arise in the superconducting windings, which can lead to a breakdown (quenching) of the superconductivity. This could be avoided with a great technical effort, but the result would be an uneconomical plant. Furthermore, the method described by C.-J. Wu et al. with a large coil necessarily requires that a current is continually passed through the coil regardless of the occurrence of oscillations, through which losses occur, particularly in the region of the cooling plant.

Furthermore, the measurement of speed differences in the generator axle as a control variable is susceptible to faults, since the speed deviations relative to the rotational speed of the axle are very small. This is, on the on hand, due to the fact that the axles sometimes rotate at rates of more than 1,000 revolutions per minute and, on the other hand, the angular velocities caused by torsional oscillations in axles of large diameter of, for example, more than 20 cm, are very small. Thus, in the drive trains of large generators, oscillations of about 30 Hz with an overall angular torsional amplitude of one tenth of a degree can lead to critical loading. In view of the large angular velocity of the shaft due to the rotation during operation, the measurement of such angular torsions via a measurement of the speed of the shaft is susceptible to faults and unreliable.

It is an object of the invention to provide a method and a device for damping torsional oscillations in rotating drive trains wherein the damping is to be carried out with minimal effort and resonance oscillations in the drive train are to be suppressed. In addition, the damping of a plurality of drive trains of different electrical machines connected to a network, possibly with different torsional resonant frequencies, should take place with the least possible effort.

These objects are solved, with regard to the method, by the features of claim 1 and, with regard to the device, by the features of claim 23.

The invention is based on the idea that exclusively torsional oscillations that are problematic during operation of a plant having a drive train with an electrical machine are damped. Problematic, for example, are torsional oscillations at a particular frequency that could lead to damage to parts of the plant. This has the advantage that the damping power utilised can be minimised.

According to the invention, the damping takes place in accordance with a classical mechanical damping. The damping is applied antiphase to the angular velocity of the torsional oscillation. This is advantageous, since by this means, the energy is used in targeted manner for damping the torsional oscillation. The torsional oscillation of a drive train may be represented in simplified form as the differential equation for a simple torsional oscillator:

$$I\Phi^{**} + c_\Phi \Phi^* + k_{101}\Phi = 0.$$

Here, I is the moment of inertia of the oscillator, $c_\Phi$ is the torsional damping constant and $k_\Phi$ is the torsional spring constant. $\Phi$ is the time-dependent displacement variable of the torsional oscillation. The first time derivative of the displacement variable is the angular velocity $\Phi^*$ and the second time derivative is the angular acceleration $\Phi^{**}$. A damping torque is effective when it causes the maximum torque on passing through the zero position of the displacement variable, that is, antiphase to the angular velocity.

Preferably a drive train having at least one machine for electro-mechanical energy conversion is damped, where this can be, for example, a generator and/or a motor. The machine can be a synchronous or an asynchronous machine. The drive train can, for example, be a steam turbine with a generator connected to it, a wind power plant with a generator, a hydro-electric turbine with a generator or an intermediate storage for electrical energy with a flywheel, a motor which drives the flywheel, and a generator. The intermediate storage for electrical energy can also have an electrical machine for driving or output of the flywheel. The electrical machine may also be, for example, a motor for a rolling plant. During the intended operation, the drive train of the plants described here normally rotates continuously. It may rotate continuously at a constant angular velocity or with a variable angular velocity in a consistent direction in a range between two angular velocities including switching on and off procedures. The method according to the invention can also be used in plants in which it is particularly important to dampen oscillations occurring during the switching on and/or off operation.

The electrical machine is connected to an electrical multipole, which is able to drive the machine and/or draw power from the machine. The multipole may represent a three-phase network or a simple alternating current or direct current network. The multipole may be a public supply network or an internal supply network for a factory. If a rigid network (e.g. a public supply network) is supplied by the electrical machine, the effect of the damping according to the invention can be enhanced if the supply network of the electrical machine with the damping device is decoupled from the rigid network by an inductor (e.g. a choke or transformer). By means of this measure, the input inductivity of the supply network is advantageously increased for the effective power provided by the damping device. A similar principle applies for an electrical machine supplied from a rigid network.

Preferably, the damping device is matched to a resonant frequency of a torsional oscillation, whereby, on the one hand, the accuracy demands made on the measuring apparatus and, on the other hand, the power used for damping can be minimised. Damping at the resonant frequency also has the following advantage. Generator plants with their associated turbines and moving masses or other plants with electrical machines of comparable size are usually left unchanged in their configurations over years. Therefore, the resonant frequencies of the torsional oscillations of the drive trains also remain substantially unchanged. The device can be tuned to the lowest resonant frequency of the drive train or a higher torsional resonant frequency. The tuning can also be made to a variant frequency, which lies, for example, 3% above or below a resonant frequency. The frequency tuning may be determined depending on the design and made non-controllable. It is sufficient if the regulation of the device according to the invention controls the amplitude and phase length of the damping. The fact that the device is tuned to a resonant frequency can also yield cost advantages.

Advantageously, the invention is used for torsional damping of drive trains whose resonant torsional oscillation has a quality factor of 500 or more. Given low damping, the quality factor is indirectly proportional to the damping factor of an oscillation to a good approximation and describes the decay behaviour. The method can also advantageously be used with a quality factor of more than 300 or 150. Torsional oscillations with such a large quality factor typically occur in large, high-mass plants.

Alternatively, the invention can also be advantageously used with drive trains whose resonant torsional oscillation has a quality factor of less than 150, for example in production plants. If torsional oscillations are damped according to the invention in production plants, this offers the advantage that the manufacturing accuracy is increased.

The quality factor with the damping torque applied according to the invention is preferably below 200. The quality factor with the damping torque applied can also advantageously lie below this, for example, under 150 or under 100. A quality factor of under 70 is possible, depending on the action of the damping. A low quality factor has the advantage that the oscillation rapidly decays.

In a preferred embodiment of the invention, the amplitude or the power of the damping torque is controlled dependent upon a control variable. As the input variable, the controller uses a control variable representing the mechanical load through torsion (torsional loading) at at least one site in the drive train. Preferably, the torsional loading of the drive train is measured at least one site where the mechanical loading is a maximum. By this means, torsional oscillations can be detected particularly precisely and faultlessly. Particularly in the case of drive trains with large diameters, the torsional loading due to a resonance oscillation can be very high, even with relatively small torsion angles. The measurement of the mechanical loading at a suitable site therefore offers advantages compared with a simple angular velocity measurement at the shaft of an electrical machine, although with suitable signal processing, measurement of the angular velocity can be provided at the machine. Using torsional loading as a control variable for the strength of the damping has the advantage that the torques used for damping the torsional oscillations can be specifically applied and, with suitable setting of the controller, do not lead to overcompensation, i.e. to excitation of oscillations.

The control variable can be determined from the measurement signal of a sensor or from the measurement signals of a plurality of sensors. A plurality of sensors could have the advantage that with suitable signal processing by the sensors, disturbance variables can be filtered out. One sensor could have the advantage that it involves a smaller effort for the construction and installation of the measuring equipment. Where a plurality of sensors is used, they are preferably applied at different positions on the drive train. The various positions can be spaced from each other azimuthally or axially in relation to the drive train. Thus, for example, an arrangement of two torsional strain gauges on two opposing positions on the drive train such that the two sensors enclose an azimuthal angle of 180° is advantageous. With suitable processing of the output signals from the sensors, disturbance variables caused by a property of the drive shaft that varies over the periphery of the drive shaft can be filtered out. With suitable signal processing, other azimuthal angles, for example, 30° or 90° are also possible. Preferably, a plurality of sensors can be applied axially spaced from each other. Torsional strain gauges axially spaced from each other are particularly advantageous if the precise intrinsic shape of the resonant torsional oscillations and the site of maximum mechanical loading are initially unknown.

If measurement of the torsional loading is undertaken with the aid of one or more angular velocity sensors, two angular velocity measuring equipments axially spaced from one another offer particular advantages, since by this means, the torsional loading of the components of the drive train lying between the two sensors can be determined.

In continuous operation, the angular velocity of the shaft of the electrical machine is subject to changes which, even when of minimal size, severely hinder determination of the torsional loading or even make it impossible. It should be considered that the angular velocity due to the torsional oscillation is very small compared with the constant angular velocity of the shaft. In large generator plants, for example, angular velocities of over 1,000 revolutions/minute are usual. Due to the high torsional spring rigidity resulting from the thick drive trains, very small deflections arise during torsional oscillations. Combined with the often low frequency of the first resonant torsional oscillation, for example, between 10 Hz and 40 Hz, this leads to torsional oscillations of small angular velocity. These small torsional angular velocities can present a great problem from the measuring standpoint. Therefore, the measurement using a difference signal from two axially spaced sensors is advantageous. However, if a sufficiently accurate sensor is used in conjunction with a very good signal processing, it is also possible to use just one sensor.

Advantageously, the invention can be realised with various types of sensor. If measurement of the torsional loading is carried out with angular velocity sensors, all the known optical angular velocity sensors can be used. These have the advantage that they measure without contact, are tried and tested and are also economical.

Preferably, however, the torsional loading is measured directly. For this purpose, for example, strain gauge strips can be used, these being attached, for example glued, onto the shaft. Due to the small extensions, particularly in shafts of large diameter, long strain gauge strips with a plurality of parallel tracks are useful. Using strain gauges, the mechanical loading is measured directly, which can be advantageous compared with indirect measurement.

Preferably contactless measurement of the torsional loading is undertaken, for example, with a magnetostrictive sensor. Various sensors for magnetostrictive measurement of torsional loading are known in practice, such as the "Contactless Torque Sensor" from the Fraunhofer Institute for Industrial Mathematics in Kaiserslautern (data sheet Fraunhofer ITWM 2001). For use on large shafts, magnetostrictive sensors are particularly advantageous due to their high accuracy. In order to preclude disturbing influences, which can be caused, for example, by material inhomogeneities circulating with the shaft, a plurality of sensors can be applied in the peripheral direction of the shaft.

The measurement signal from the sensor or sensors is processed so that it can be used for controlling the damping. Preferably, a feedback variable is derived from the control variable which is obtained from the measurement signal from one or more sensors. The feedback variable preferably represents the angular velocity originating from the resonant torsional oscillation. If this angular velocity is determined directly from the difference in the signal from two angular velocity measuring sensors as described above, this signal is advantageously now only filtered, in order to obtain the feedback variable. Further process steps may be provided in order to screen out disturbance variables. If the torsional loading is measured directly, the displacement variables can be derived in order to obtain a variable corresponding to the angular velocity of the torsional oscillation.

Advantageously, for this purpose the filtered measurement signal is phase-shifted and inverted. If the overall phase shift in the control circuit is substantially 90°, on inversion a variable comes about which is antiphase to the angular velocity of the torsional oscillation. If the signal is processed, before or after the phase shift and inversion, with a filter which is designed such that the output signal is mainly an oscillation signal corresponding to a torsional resonant frequency of the drive train, this offers the advantage that the damping device uses the employed power mainly or exclusively for damping the resonant torsional oscillation.

Damping of the torsional oscillation takes place in the method according to the invention with the damping device according to the invention in that effective power is generated in the machine. By this means, depending on the phase position of the torsional oscillation and of the damping torque, the machine is decelerated or accelerated. Advantageously, an intermediate energy storage is used in which energy which is drawn from the electrical machine in a braking phase, is temporarily stored in order to apply it to the machine in the next acceleration phase as effective power. Alternatively, the energy may be drawn from another energy carrier. If the multipole connected to the electrical machine is an alternating current circuit, then a direct current circuit with an oscillator portion, which can also be designated an oscillating current portion, is advantageously used as the intermediate energy storage.

A coil is particularly suitable as the intermediate energy storage in the direct current circuit, since it advantageously has a large energy storage capacity. Alternatively, it is possible, within a direct current circuit, to use an arrangement of capacitors and/or inductors and/or additional ohmic resistors as intermediate energy storages.

If a coil is used as the intermediate energy storage, this coil is advantageously a coil with or without an iron core, which is air or water-cooled. These are distinguished, in comparison with, for example, superconducting coils, by substantially lower acquisition costs and maintenance costs. It is also possible, however, to use a coil different from those mentioned here. A combination of coils is also possible.

Preferably, the overall inductance of the at least one coil is less than 5 mH. By using coils of lower inductance, cost savings and a compact construction of the damping device can be achieved. In larger plants or with low resonant frequencies, larger coils, for example, up to 10 mH or even 20 mH or above (e.g. 50 mH) may be advantageous. In particular applications, overall inductances of less than 3 mH or even 1 mH may be sufficient and advantageous. A further, particularly important advantage of the use of small inductances consists in the possibility of being able to charge up the coil rapidly. The current build-up in the coil can take place within a short time, for example, a few milliseconds. The coil does not have to be maintained with current constantly flowing through it and may possibly first be charged up, on occurrence of a resonant torsional oscillation, during the first period. The damping device is therefore able to save losses, which would arise if the coil were maintained with current flowing.

Advantageously, the direct current circuit is connected via a current converter to the alternating current circuit. In the case of a three-phase circuit with a network frequency above the torsional resonant frequency, this is accomplished with a 6-pulse bridge circuit. It is alternatively possible, however, to use a 12-pulse bridge circuit or other circuits. If the torsional resonant frequency is above the network frequency of the alternating current circuit, other current converters than those mentioned may be useful. In the case of a 6-pulse bridge circuit or other thyristor-equipped current converter, the direct current circuit may be current-controlled by suitable firing angle control of the thyristors. The thyristor control is carried out according to known methods of current converter technology.

In a further preferred variant of the invention, a capacitor is used as the energy storage on the direct current side of the current converter. This has the advantage that the direct current side can be operated under voltage-control and that, for example, IGBT transistors can also be used in the current converter. This offers the advantage that the valves of the current converter are switchable independently of the network frequency on the alternating current side of the current converter and that thereby effective power can be produced in the multipole at almost any frequency, including significantly above—for example, twice—the network frequency. Voltage control in the IGBT current converter takes place in a manner known from the prior art.

An advantageous alternative is represented by GTO thyristors, which operate under current control and can be switched off. In the case of GTO thyristors, coils may advantageously be used as energy storages. Since GTO thyristors can be switched off, it is possible to generate effective power at significantly higher frequencies than the network frequency. GTO thyristors also offer the advantage that they are economical. For GTO thyristors, in general a more efficient control circuit is required than for thyristors, since a large control current is needed for switching off. The invention is preferably used for damping torsional oscillations in a drive train with an electrical machine which is a synchronous machine. This has the advantage that the network frequency is determined by the rotation rate of the synchronous machine. By this means, given a known frequency of the torsional oscillation and a known network frequency or a known network frequency range, the current converter can be suitably designed. If the network frequency lies in a range above the torsional frequency to be damped, for example, the aforementioned 6-pulse or 12-pulse bridge circuits can be used.

Depending on the specific application, the usability of the method with an asynchronous machine or a synchronous machine may require an additional technical effort, for example, with a rotary speed-variable drive. This effort concerns the adaptation of the current converter to the network frequency which may possibly be variable within a wide range.

Advantageously, the current converter has its alternating current side galvanically separated from the alternating current circuit. This has the advantage that the voltage can be adjusted on the current converter side via the transformation ratio of the transformer. This adjustment is made dependent on the voltage in the alternating current circuit to which the electrical machine is coupled. An arrangement without galvanic separation is also possible, where advantages can result from dispensing with the transformer.

From the feedback variable of the control circuit, by means of suitable measures, a target value is formed for the phase angle control of the current control system or the voltage control system of the direct current circuit. Advantageously, for this purpose, an oscillating component or an alternating component which represents the feedback variable and accordingly has a frequency, which substantially corresponds to the torsional resonant frequency to be damped, is added to a direct current component or direct component. If the current converter is now controlled with the target value thus formed, then a damping power corresponding to the oscillating component of the target value is brought to bear in the machine.

The degree of damping may advantageously be controlled in that the amplitude of the oscillating component of the target value is controlled. The larger the oscillating component, the more energy is drawn from the machine in each torsional oscillation phase and fed back again. Furthermore, the damping power can be adjusted via the size of the direct current component. It is thereby advantageously possible to stipulate in advance a maximum damping power, since the maximum storable energy in each phase is dependent on the direct current component. Control of the direct current component offers particular advantages on initial setting-up and commissioning of the damping device in a new or already existing plant. Preferably, the direct current circuit is switched to zero current when no torsional oscillations occur. Following decay of a torsional oscillation also, the direct current circuit can be switched to zero current, possibly after a waiting time.

The damping device is set up to provide effective power at the frequency of a torsional resonant frequency of the drive shaft in the electrical machine. If the control circuit were not functioning, this could lead to severe damage to the plant in a short time. Therefore, current regulation in the direct current circuit is particularly advantageous for the operational reliability of the damping device, since with a small direct current component and correspondingly small maximum effective power, the functional capability of the control circuit and of the overall damping device can thereby be checked. In operation, the current regulation enables limitation of the damping power, whereby overloading of the current converter and/or of the coil and/or of other components can be prevented.

The damping device can advantageously be operated at a very low power level. This has the advantage that all components in the region of the current converter and of the direct current circuit can be economically designed. Preferably, the damping device is designed to use a maximum of 5% of the electromechanically converted power as damping power. This is sufficient in most cases, since only the oscillations in the resonant frequency range are damped with the damping device. It is alternatively possible to rate the plant for a maximum of 1% or 3% of the power converted by the machine. A rating of 10% or 20% may also be useful.

The method and the damping device are particularly suited to plants with electrical machines wherein the mass of the rotating drive shaft with the components attached thereto and rotating therewith amounts to more than 20 tons. The torsional oscillation properties are substantially determined by the moments of inertia of the components mounted on the drive shaft. Low resonant frequencies at low damping, for which the method according to the invention is particularly suitable, preferentially occur in drive trains having large moments of inertia. Use of the method and the device for damping is particularly advantageous when the total moment of inertia of the drive train with the components mounted thereon amounts to more than 5,000 kgm$^2$. Its use can also be helpful with smaller moments of inertia, for example above 1,000 kgm$^2$. The method is particularly suited to very large moments of inertia of over 20,000 or 80,000 kgm$^2$. Its use is therefore particularly advantageous where the overall mass of the rotating components of a drive train is over 40 or 100 tons.

Low resonant frequencies, which can advantageously be damped with the damping device according to the invention, can also occur in drive trains of significantly smaller mass. The resonant frequency depends not only on the moment of inertia of the rotating masses, but also on the torsional spring rigidity of the shafts linking the rotating masses. It is therefore possible for low resonant frequencies to occur in, for example, paper-making or printing machines, which have rotating masses of between one and five tons, since the torsional spring rigidity of the shafts have the relevant values.

In large plants, the damping device is advantageously subdivided into one control module and a plurality of power modules, whereby the overall damping output is scaleable via the number of identically constructed power modules. The modules are designed so that one control module is able to control a plurality of power modules. The power modules each comprise a current converter, possibly a transformer for galvanic separation from the network, a direct current circuit connected to the current converter and having an intermediate energy storage, preferably in the form of a coil, and the firing angle control. Alternatively, the firing angle control may also be contained in the control module. The control module contains all the devices provided for signal processing and, on its input side, has connections for one or more sensors. With this design, existing damping devices may advantageously have their maximum power increased through the additional installation of power modules.

If a network includes a plurality of electrical machines, that is, if a plurality of electrical machines are connected to the same multipole, then resonant torsional oscillations can advantageously be separately damped in the drive trains of the individual electrical machines if the drive trains have different torsional resonant frequencies. For this purpose, a damping device is provided for each torsional resonant frequency of a drive train of an electrical machine in the network, each being tuned to the respective torsional resonant frequency. The power generated for damping in the network in order to dampen the torsional oscillation of a drive shaft is not hazardous to the drive train of another electrical machine in the same network, since no resonance oscillation can be excited there if the torsional resonant frequencies of the drive shafts are different.

In one advantageous embodiment, the damping device according to the invention is suitable for damping a plurality of torsional oscillations at different frequencies of a rotating drive train. For this purpose, the damping torque applied to the drive train contains frequency components of various predetermined frequencies, the frequency components being antiphase to the angular velocities of the various torsional oscillations. This has the advantage that a plurality of low frequency torsional oscillations that could represent a hazard during operation of the drive train, can be damped in a favourable manner. For this purpose, the damping device advantageously has a plurality of measuring equipments with which feedback variables can be determined for various torsional oscillations of the drive train at different frequencies. The plurality of measuring equipments may be linked to one or a plurality of sensors. For example, it may be provided that each measuring equipment is linked to an associated sensor or a plurality of associated sensors. This has the advantage that the sensors may be separately tuned to the respective measuring equipments and to the frequencies to be measured by the measuring equipments. Alternatively, it may be provided that a plurality of measuring equipments use the signal from one or more sensors jointly. This has the advantage that a separate sensor or a plurality of sensors does not have to be assigned to each measuring equipment.

Preferably, at least some of the predetermined frequencies at which the plurality of torsional oscillations of the drive train are damped substantially correspond to resonant frequencies of the drive train. This has the advantage that the power used for damping can be minimised, since the damping power is used for torsional oscillations, which represents a danger during operation of the plant. A plurality of different resonant frequencies, which can be damped particularly advantageously with the damping device according to the invention, occur, for example, in turbine generators having a plurality of turbines, for example, one high pressure turbine, one medium pressure turbine and two low pressure turbines. Each turbine, the generator itself and any further components represent rotating masses linked by shafts. An arrangement of this type often has a plurality of intrinsic oscillation forms with a low resonant frequency. A low resonant frequency is one, for example, below 50 Hz or below 100 Hz. The associated oscillation forms are distinguished thereby that one or more rotating masses oscillate in opposition to the other rotating masses. For example, with the turbine generator described, the high pressure and the medium pressure turbine can oscillate in opposition to the other turbines, or the high pressure, the medium pressure and one low pressure turbine may oscillate in opposition to the other low pressure turbine and the generator at low resonant frequencies. In order to detect the various torsional oscillations as precisely as possible, one or more sensors are arranged at the sites on the drive train where the deformations brought about by the torsional oscillations are a maximum. For example, an arrangement of oscillation sensors on the respective shafts between the rotating masses is advantageous, since the greatest deformations are to be expected there given the intrinsic oscillation forms of the resonant frequencies. Preferably the measuring equipment tuned to a predetermined resonant frequency is linked to the sensor or sensors arranged at the site where the deformation brought about by the torsional oscillation at the respective resonant frequency is a maximum. This has the advantage that a minimum effort is required in the region of the measuring equipments for further processing the sensor signals representing the control variables.

Preferably, with the measuring equipments, a plurality of feedback variables are formed from the plurality of control variables, each feedback variable having a frequency that is substantially equal to the frequency of the corresponding torsional oscillation. The amplitude of each feedback variable depends upon the strength of the torsional oscillation assignable to this feedback variable. This has the advantage that each of the torsional oscillations to be damped is damped at the correct level and overcompensation, i.e. oscillation excitation, does not occur. Advantageously, a measuring equipment can only output a feedback variable if a torsional oscillation occurs at the corresponding frequency and an amplitude above a previously defined threshold value. This has the advantage that the damping device is only used if an oscillation could actually occur that would represent a disadvantage in operation. Advantageously, the damping device has a feedback variable adder, which adds the feedback variables output by the measuring equipments and whose output is linked to the input of the adder of the controller. In the adder of the controller, the direct current portion influencing the amplitude of the damping power is added to the sum of the feedback variables. The feedback variable adder has the advantage that only one power module is needed for various oscillations to be damped. Alternatively, it may be provided that a plurality of power modules are used, where, for example, one power module damps torsional oscillations of the lowest resonant frequency and a further power module damps torsional oscillations of the two resonant frequencies lying above it.

At the output of the adder, the sum of the feedback variables and of the direct current portion is output, this sum representing the target value for the current converter.

Alternatively, it is also possible to carry out the tasks of the measuring equipment using a computer with analogue-to-digital and digital-to-analogue converters. This offers the advantage that signal processing including filtration and phase shifting can be adapted with little effort. Summation of the feedback variables and adding the direct current component may also be performed digitally. This has the advantage that the computer assumes the function of the many individual elements, so that the structure of the damping device is simpler. By contrast, the structure comprising individual analogue elements offers the advantage that filtration and phase shifting are carried out reliably within a given time span without depending on the capacity utilisation of a computer.

The invention can advantageously be used in particular for damping torsional oscillations or resonant torsional oscillations in a drive train of a wind or turbine generator, a ship drive system, a helicopter drive, a lift drive or an upright shaft. For this purpose, merely technical adaptations of the damping frequency and the damping power to the respective application are necessary.

Figure 2:
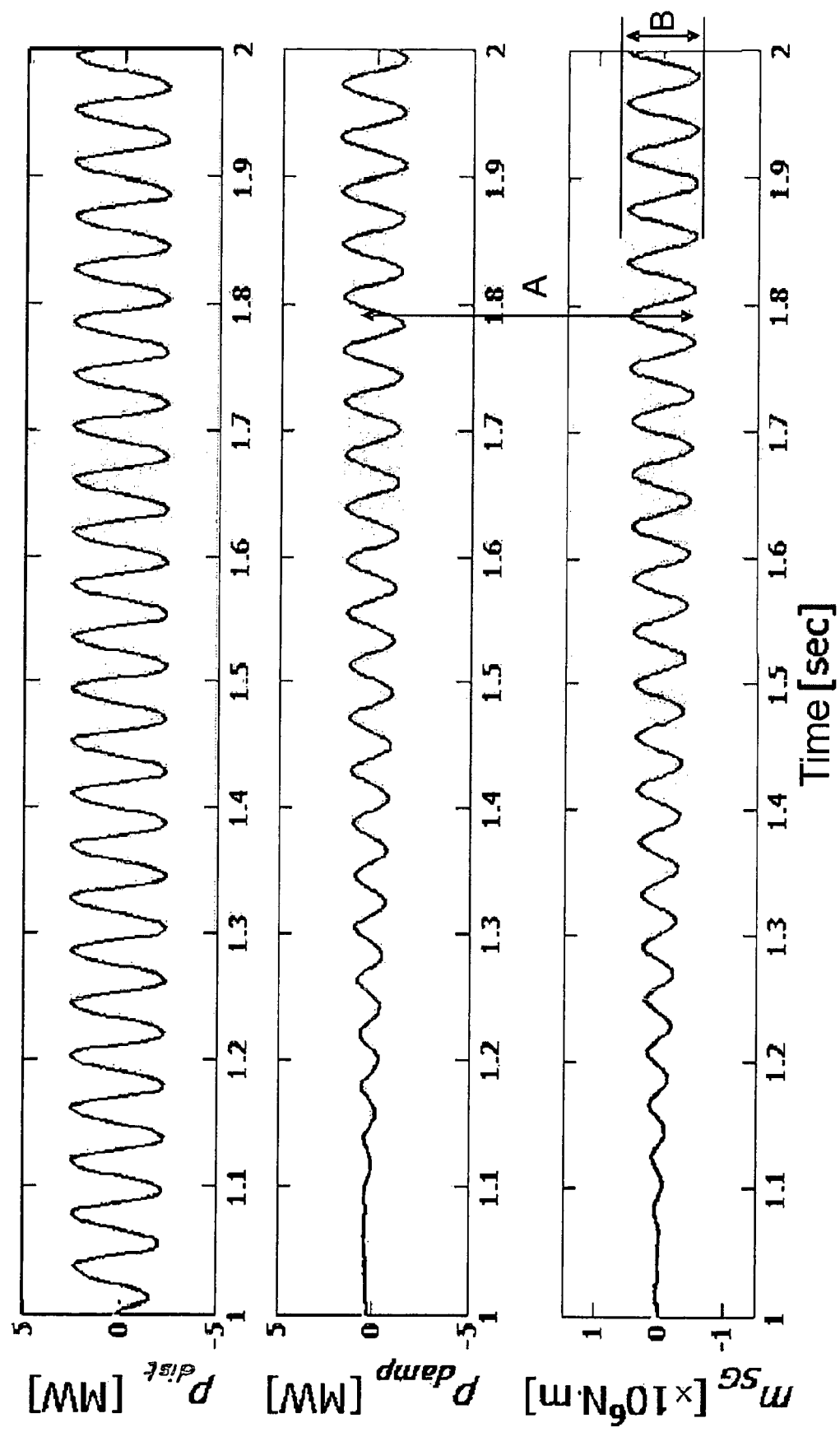
Figure 3:
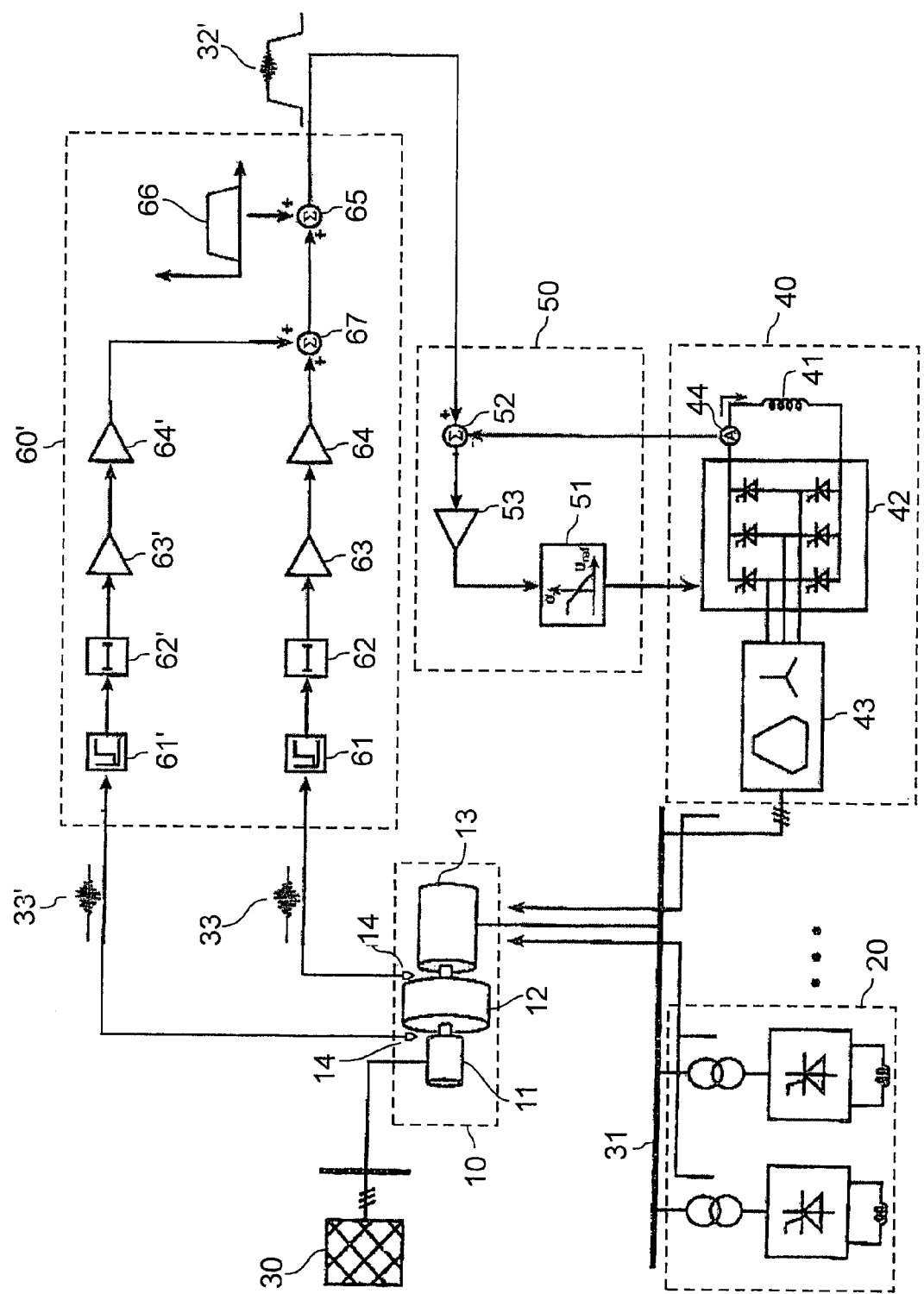
Figure 4:
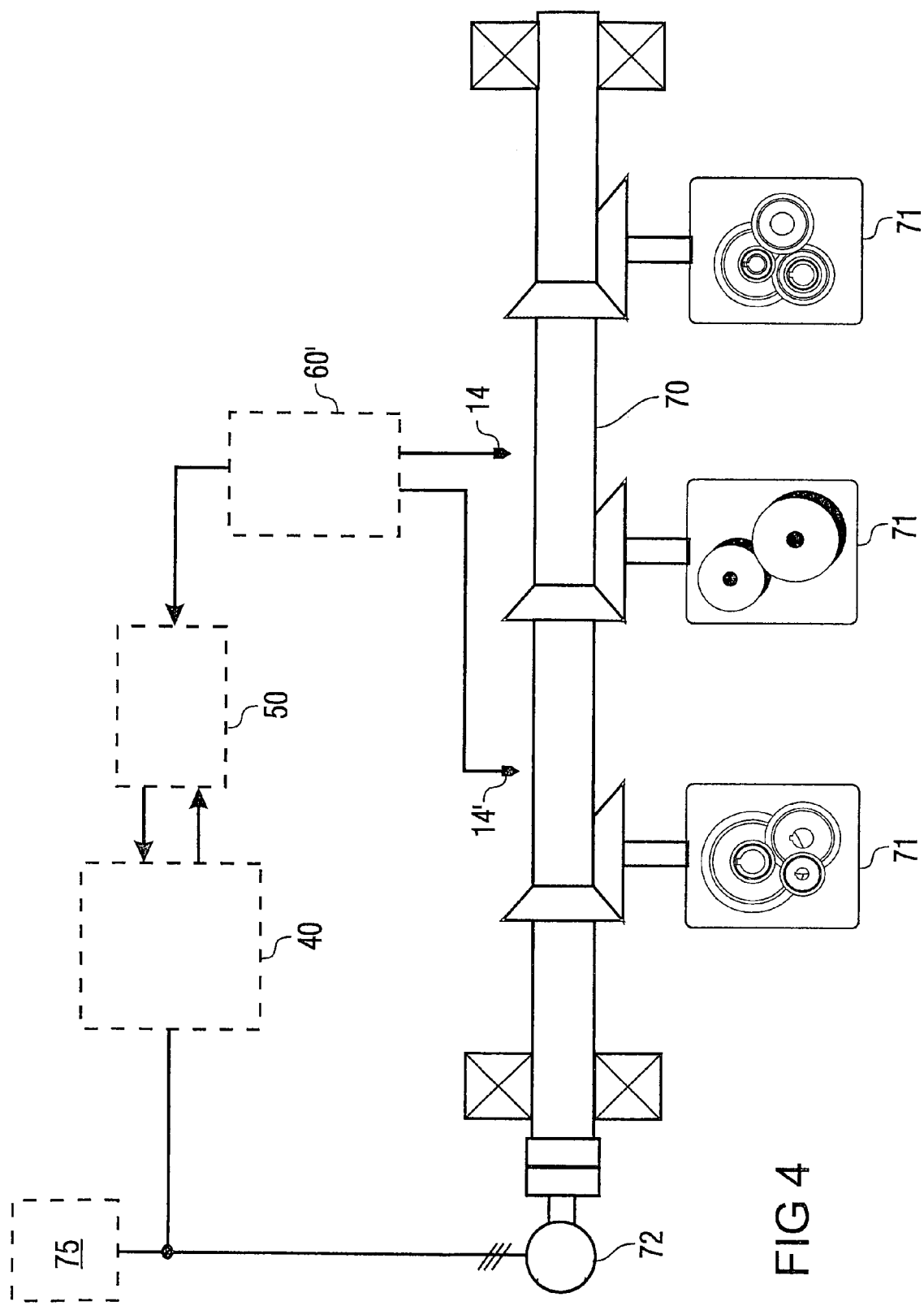
Figure 5:
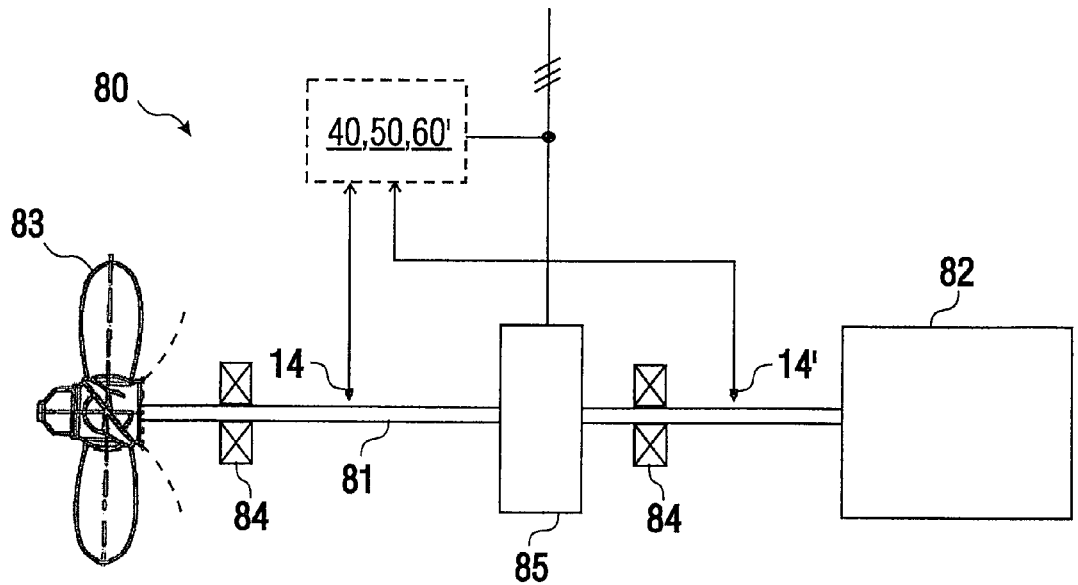
Figure 6:
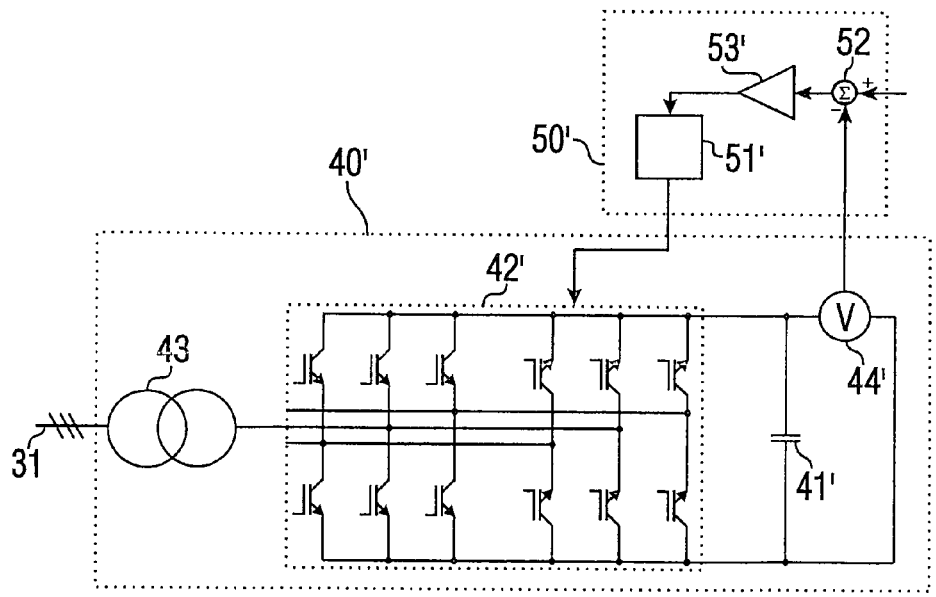

The invention will now be described in greater detail by reference to the drawings, in which:

FIG. 1 shows a schematic representation of an exemplary structure of a damping device, FIG. 2 shows a representation of a plurality of data recorded during operation of a damping device, FIG. 3 shows a schematic representation of a further exemplary structure of a damping device, FIG. 4 shows a schematic representation of an embodiment of the invention for an upright shaft, FIG. 5 shows a schematic presentation of a further embodiment of the invention for the shaft of a ship drive system, and FIG. 6 shows a schematic representation of an alternative embodiment of a power component of the invention.

FIG. 1 shows in the centre an energy supply unit 10 which is used, in particular, for the supply of severely varying electrical loads from consumers 20. The energy supply unit 10 comprises a motor 11 which drives a drive train with electrical energy from a public network 30, on which drive train a flywheel mass 12 and a generator 13 are also mounted. The generator 13 outputs a power of 140 MVA (short time rating) or approximately 20 to 30 MVA (continuous rating). The generator 13 converts the mechanical energy of the flywheel mass 12 into electrical energy and feeds this into a supply network 31 separate from the public network 30. The supply network 31 is a three-phase network which is operated at network frequencies between 85 Hz and 110 Hz.

At the first intrinsic torsional oscillation form, the resonant frequency of the drive train is approximately 25 Hz in this example. With this intrinsic form, the shaft of the generator 13 rotates relative to the shaft of the flywheel mass 12. The greatest torsional loading therefore occurs in the drive train in the region between the flywheel mass 12 and the generator 13. Other intrinsic torsional oscillation forms of higher resonant frequency can exist in the drive train, although these are not to be damped with the damping device shown in FIG. 1.

The torsional oscillations are excited by load changes made by the consumers 20, which are supplied over the supply network 31 with electrical energy from the generator 13. Also connected to the supply network 31 is the damping device according to the invention, which has a power module 40, a control system 50, a target value setter 60 and a sensor 14. The mechanical loading due to the torsional oscillation is detected in the example by the sensor 14, which uses the magnetostrictive effect based on the mechanical load caused by the torsion. The sensor 14 supplies a signal 33 whose shape is made up of the oscillation amplitude of the torsional oscillation and any disturbance variables. In the measuring equipment, which comprises a filter 61, a phase shifter 62, an inverter 63 and an amplifier 64, the signal 33 is filtered, phase-shifted, inverted and amplified. The feedback variable thereby determined is an oscillation signal having the frequency of the resonant frequency of the torsional oscillation, whose amplitude corresponds to the strength of the resonant torsional oscillation. The feedback variable is added to a settable direct current component 66 in an adder 65 to form a target value 32 for the control system 50 of the power unit 40. The direct current component 66 is set depending on the operating condition of the damping device or is preset manually. On occurrence of a torsional oscillation, the direct current component 66 may also be set depending on the measured amplitude of the torsional oscillation.

The control system 50 controls the power unit 40 such that said power unit outputs effective power via the supply network 31 to the generator 13. The effective power is determined by the direct current component and the alternating current component. In detail, a firing angle control system 51 which is connected to a current converter 42 in the power unit 40 is driven via an amplifier 53. The current converter 42 comprises a 6-pulse bridge connection with thyristors. The firing angle control 51 controls the 6-pulse bridge connection 42 using a conventional firing angle process with simultaneous switching of two valves to current-carrying and the formation of three groups having a relative offset of 120°.

Arranged on the direct current side of the current converter 42 in a direct current circuit, which is current controlled by the current converter 42, is an ammeter 44 and a coil 41 of approximately 1 mH. The ammeter 44 serves as a measuring equipment for an adder 52, which subtracts the current actually flowing in the direct current circuit from the target value 32. The coil 41 represents an intermediate energy storage.

Furthermore, a transformer 43 is connected to the current converter 42, via which transformer the 6-pulse bridge connection of the current converter 42 is connected in galvanically separated manner to the supply network 31. In the instance shown, the transformer 43 is a three-phase transformer with which the 6-pulse bridge connection can be operated at a suitable voltage level.

For initial build-up of the current in the direct current circuit, effective power corresponding to the direct current component of the target value 32 is drawn from the generator 13 via the supply network 31, the transformer 43 and the current converter 42. Due to the low inductance of the coil, the build-up of the current in the direct current circuit on occurrence of a torsional oscillation at the resonant frequency can take place within a few milliseconds. This demonstrates the highly dynamic nature of the damping according to the invention. If a torsional oscillation occurs in the drive train at the resonant frequency, the target value 32 contains a component which oscillates antiphase to the angular velocity of the oscillation. Effective power is additionally drawn from or fed to the generator 13 corresponding to the oscillation component of the target value 32, that is at the resonant frequency, but antiphase to the angular velocity of the torsional oscillation, whereby the oscillation in the drive train is damped.

FIG. 2 shows several diagrams representing various variables recorded during operation of a damping device over time. The upper diagram in FIG. 2 shows a disturbance variable $P_{dist}$, which excites a resonant torsional oscillation in the drive train. The disturbance variable in the instance shown is a load oscillation in the electrical network to which the electrical machine is connected as a generator. The disturbance variable oscillates at a frequency which substantially corresponds to the first resonant frequency of the drive train. The torsional moment $m_{SG}$ in the drive train is shown over time in the bottom diagram in FIG. 2. It is clearly apparent that a growing torsional oscillation builds up as a result of the excitation. The torsional oscillation is recorded by the damping device, whereupon said damping device produces effective power $P_{damp}$ in the machine. The shape of the effective power $P_{damp}$ over time is shown in the middle diagram. The effective power $P_{damp}$ is phase-shifted through 90° relative to the torsional oscillation $m_{SG}$ (see arrow A) and is antiphase to the angular velocity of the torsional oscillation. Due to the damping increasing with the increasing amplitude of the torsional oscillation, the torsional oscillation is restricted despite continuing excitation (see arrow B).

FIG. 3 shows an alternative embodiment of the invention, which is suitable for damping two torsional oscillations of different frequencies in a drive train. The structure of the plant corresponds in many components to the structure of the plant shown in FIG. 1. The components identified with the same reference numbers correspond in their function to those shown in FIG. 1. The energy supply unit 10 corresponds to the energy supply unit 10 shown in FIG. 1, with the difference that in the exemplary embodiment shown here, a second torsional oscillation is to be damped, whose resonant frequency is approximately 35 Hz. In the intrinsic form belonging thereto, the shaft of the generator 13 and shaft of the flywheel mass 12 rotate relative to the shaft of the motor 11. In addition, there is also the first resonant frequency with the first intrinsic form, which was described in relation to FIG. 1.

The torsional oscillations of both resonant frequencies are excited by changes of load by the consumers 20 which are supplied via the supply network 31 with electrical energy from the generator 13. As with the embodiment shown in FIG. 1, the damping device according to the invention, which has a power module 40, a control system 50 and a sensor 14, is connected to the supply network 31. In order to determine the occurrence and amplitude of the second torsional oscillation, the damping device also has a second sensor 14' and a target value setter 60' which is derived from that in FIG. 1.

The mechanical loading due to the torsional oscillations is detected by both sensors 14 and 14', which make use of the magnetostrictive effect. The sensors 14 and 14' supply the signals 33 and 33', the shape of which is composed of the oscillation amplitudes of the torsional oscillations and possibly also disturbance variables. The signal 33 from the sensor 14 is filtered in a filter 61, as shown in FIG. 1, phase-shifted in a phase shifter 62, inverted in an inverter 63 and amplified in an amplifier 64. The feedback variable thereby determined is an oscillation signal with the frequency of the resonant frequency of the torsional oscillation, whose amplitude corresponds to the strength of the first resonant torsional oscillation. The signal 33' from the second sensor 14' is filtered in a second filter 61', phase-shifted in a second phase shifter 62', inverted in a second inverter 63' and amplified in a second amplifier 64'. The second feedback variable thereby obtained is an oscillation signal with the frequency of the resonant frequency of the second torsional oscillation, whose amplitude corresponds to the strength of the second resonant torsional oscillation. The filters 61, 61', the phase shifters 62, 62', the inverters 63, 63' and the amplifiers 64, 64' are each tuned to the respective resonant frequency.

The feedback variables determined from the two signals 33, 33' are added in a feedback variable adder 67. The result of the addition is a superimposed oscillation signal containing frequency components for damping both torsional oscillations. In order to form a target value 32', the sum of the oscillation signals representing the feedback variables are added to an adjustable direct current component 66 in an adder 65. The target value 32' serves to control the power unit 40 by means of the control unit 50. The direct current component 66 is adjusted depending on the operating condition of the damping device or is manually preset. If no torsional oscillation occurs, by setting the direct current component 66 to zero, the direct current circuit of the power unit 40 can be made current-free. The strength of the damping can be adjusted through the size of the direct current component 66 or through the amplification level of the amplifiers 64, 64'. By means of the amplification ratio of the two amplifiers 64, 64', the ratio of the damping of the two torsional oscillations may also be adjusted.

The further structure and functional method of the example shown in FIG. 3 corresponds to the example shown in FIG. 1. If more than two torsional oscillations with more than two different resonant frequencies of a drive train are to be damped, then this can be achieved in simple manner by extending the target value setter 60' in conjunction with further sensors. To this end, the target value setter 60' is extended by one further channel comprising filter, phase-shifter, inverter and amplifier, whose signal is added in the feedback variable adder 67 to the other feedback variables.

FIG. 4 shows how, with the aid of the invention, oscillations in an upright shaft 70 can be damped. The upright shaft 70 drives various consumers 71 and is itself driven by a variable speed drive. The variable speed drive comprises a synchronous motor 72, which is supplied with three-phase current from an energy supply unit 75, said current having a changeable frequency depending on the desired rotation rate of the synchronous machine 72.

As in the exemplary embodiment shown in FIG. 3, the torsional loading of the upright shaft 70 is determined at different sites with two sensors 14, 14'. Evaluation of the oscillation signals and the damping via the synchronous machine 72 takes place according to the principle shown in FIG. 3 and described in the text relating to FIG. 3, with a modified target value setter 60', a control system 50 and a power module 40. The power module 40 is connected to the three-phase network, which supplies the synchronous machine 72.

As distinct from the oscillation excitation in FIG. 3, in the case of the upright shaft 70, the oscillation excitation is not caused by load variations from electrical consumers, but by load variations from mechanical consumers 71. However, this does not alter the fundamental operational method of the invention.

FIG. 5 shows, by way of example in a schematic representation, how resonance oscillations in a shaft 81 of the drive 80 for a ship can be damped. In the example shown, a diesel ship engine 82 with a maximum power output of approximately 30 MW powers a propeller 83 via the shaft 81. The mounting of the shaft 81 is shown purely schematically here with just two bearings 84. In order to supply the ship with electrical power, the drive 80 has a generator 85 with a maximum power output of approximately 2 MW, driven by the propeller shaft 81.

Resonant torsional oscillations can be evoked in the propeller shaft 81 by load changes on the propeller 83, for example, caused by heavy seas. Resonant torsional oscillations can also be caused by load changes from electrical consumers connected to the generator 85. The two lowest intrinsic resonant torsional oscillation forms in the shaft 81 have the following two intrinsic oscillation forms. In the case of the first resonant frequency, the shaft 81 twists between the drive engine 82 and the generator 85, that is, the moment of inertia of the rotating components of the drive engine 82 counteracts the moments of inertia of the moving components of the generator 85 and the propeller 83. The second intrinsic oscillation form comprises twisting of the propeller 83 relative to the generator 85 and the drive engine 82. The occurrence of a resonant torsional oscillations having the second intrinsic form can be detected with the sensor 14, whilst the occurrence of a resonant torsional oscillation with the first intrinsic form can be detected with the sensor 14'. Damping of the oscillations takes place, as described in conjunction with FIG. 3, through use of a modified target value setter 60', a control system 50 and a power module 40, which is connected to the multipole linked to the generator.

By means of the invention, resonant torsional oscillations in the drive train of a helicopter can also be damped. This is carried out in a similar manner as with the ship drive described above, in that a generator for electricity generation which is part of the drive train is used to apply a damping moment to the drive train.

FIG. 6 shows an alternative embodiment of the power module 40 as an IGBT power module 40'. Since IGBT transistors are operated with voltage control, a suitably adapted IGBT control system 50' is necessary for controlling the IGBT power module 40'. The alternative parts shown may be used in place of the power modules 40 and control systems 50 shown in FIGS. 1 and 3 to 5, particularly if resonant torsional frequencies are to be damped that lie significantly above the network frequency of the alternating current side of the current converter 42 of the power module 40, for example, above double the network frequency.

In place of the coil 41, the IGBT power module 40' has a capacitor 41' as the energy storage. The capacitor 41' has a capacitance of 20 mF and is linked to an IGBT current converter 42'. The IGBT current converter 42' has twelve IGBT transistors, which can be controlled such that the capacitor 41' can draw energy from or supply energy to a multipole 31 via a transformer 43. The multipole 31 and the transformer 43 correspond to the parts assigned the same reference numbers in FIG. 1. Arranged on the direct current side of the IGBT current converter 42', connected in parallel to the capacitor 41', is a voltage measuring equipment 44', which serves to supply the IGBT control system 50' with a measurement value for determining the charge condition of the capacitor 41'.

Like the control system 50 shown in FIG. 1, the IGBT control system 50' has an adder 52 and an amplifier 53, which have the same functions as the parts shown in FIG. 1 with the same reference numbers. In place of the firing angle control 51, an IGBT control module 51' is used, which controls twelve IGBT transistors of the IGBT current converter 42' in voltage-controlled manner such that energy is supplied to and drawn from the multipole 31 via the transformer 43 at a frequency that is suitable for damping resonant torsional oscillations arising in the drive train. The energy drawn from the multipole 31 is fed to the capacitor 41' by switching different IGBT transistors to current-carrying mode and then drawn out again after a time interval corresponding to the frequency of the damping, in order to be fed back to the multipole 31 again. Control of the IGBT current converter 42' by the IGBT control module 51' takes place in known manner. Since the IGBT transistor of the IGBT current converter 42' can be switched at any desired time by the IGBT control module 51' to conduct or block the current, it is possible to draw out or feed in energy to or from the multipole 31 at a frequency that lies significantly above the network frequency of the multipole 31.

The invention is not restricted to the preferred exemplary embodiment described above. Rather a plurality of variants and derivations is possible, which also make use of the idea according to the invention and therefore fall within the protective scope.

The invention claimed is:

1. A method for damping a torsional oscillation in a rotating drive train having at least one electrical machine, comprising the step of
    applying a damping torque with the electrical machine to the drive train, wherein the damping torque is applied at a predetermined damping frequency and antiphase to an angular velocity of the torsional oscillation.

2. The method according to claim 1, wherein the predetermined damping frequency essentially corresponds to a resonant frequency of the drive train.

3. The method according to claim 1, wherein the torsional oscillation of the drive train without the damping torque applied has a quality factor of more than 500.

4. The method according to claim 1, wherein the quality factor with the damping torque applied lies below 200.

5. The method according to claim 1, further comprising the steps of:
    determining at least one control variable, which represents a torsional loading at at least one site in the drive train, and
    controlling the damping torque depending on the control variable in a control circuit.

6. The method according to claim 5, wherein the control variable is determined from a measurement signal from one or more sensors.

7. The method according to claim 6, wherein the sensors are at least one of azimuthally and axially spaced from one another in relation to the drive train.

8. The method according to claim 6, wherein at least one of the sensors is a magnetostrictive sensor, a strain gauge or a sensor for angular velocity measurement.

9. The method according to claim 5, wherein a feedback variable is derived from the control variable, in that the control variable is filtered, phase-shifted and inverted, the overall phase shift in the control circuit substantially amounting to 90°, the feedback variable representing the angular velocity produced by the torsional oscillation at the resonant frequency.

10. The method according to claim 1, wherein for applying the damping torque, energy is temporarily stored in a direct current circuit with a direct current component and an alternating current component, the temporarily stored energy being taken from an alternating current circuit to which the electrical machine is connected.

11. The method according to claim 10, wherein the energy is temporarily stored with at least one coil in the direct current circuit.

12. The method according to claim 10 wherein the energy is temporarily stored with at least one capacitor in the direct current circuit.

13. The method according to claim 10, further comprising the following steps:
    providing a target value for current control or voltage control of the direct current circuit from the direct current component and the alternating current component, the alternating current component representing the feedback variable and having a frequency which substantially corresponds to the resonant frequency, and
    controlling the direct current circuit with the target value via a current converter connected to the alternating current circuit, effective power being brought about in the electrical machine via the alternating current circuit.

14. The method according to claim 13, wherein the damping power is adjusted via the size of the direct current component, the size of the alternating current component or both.

15. The method according to claim 13, wherein a maximum of 5% of the power converted by the electrical machine is used via the current converter for damping the torsional oscillation.

16. The method according to claim 1, wherein the overall mass of the rotating components of the drive train is more than 20 tons.

17. The method according to claim 1, wherein the torsional oscillation of at least one further drive train which has at least one further electrical machine is damped, wherein the drive trains having different resonant frequencies.

18. The method according to claim 1, wherein the electrical machine is a synchronous machine.

19. The method according to claim 10, wherein current flows in the direct current circuit only on occurrence of the torsional oscillation in the drive train.

20. The method according to claim 1, wherein a plurality of torsional oscillations with different frequencies of the rotating drive train are damped, the damping torque containing damping frequency components with predetermined damping frequencies and the damping frequency components being each antiphase to the angular velocity of the corresponding torsional oscillation.

21. The method according to claim 20, wherein the predetermined damping frequencies substantially correspond to resonant frequencies of the drive train.

22. The method according to claim 20, further comprising the following steps: determining a plurality of control variables providing a plurality of feedback variables from the control variables for the torsional oscillations, each feed back variable having a frequency that is substantially equal to the frequency of the corresponding torsional oscillations, providing the target value for current control or voltage control of the direct current circuit from the direct current component and the alternating current component, the alternating current component representing the sum of the feed back variables, and controlling the direct current circuit with the target value via the current converter connected to the alternating current circuit, effective power being brought about in the electrical machine via the alternating current circuit.

* * * * *